(12) United States Patent
Ochsendorf et al.

(10) Patent No.: US 9,349,228 B2
(45) Date of Patent: May 24, 2016

(54) DRIVER SCORECARD SYSTEM AND METHOD

(71) Applicant: Trimble Navigation Limited, Sunnyvale, CA (US)

(72) Inventors: Ricky L. Ochsendorf, Prior Lake, MN (US); William G. Nimchuk, Shakopee, MN (US); Thomas V. Dorazio, Lakeville, MN (US)

(73) Assignee: TRIMBLE NAVIGATION LIMITED, Sunnyvale, CA (US)

( * ) Notice: Subject to any disclaimer, the term of this patent is extended or adjusted under 35 U.S.C. 154(b) by 160 days.

(21) Appl. No.: 14/061,371

(22) Filed: Oct. 23, 2013

(65) Prior Publication Data
US 2015/0112546 A1 Apr. 23, 2015

(51) Int. Cl.
*G07C 5/08* (2006.01)
*B60W 40/09* (2012.01)
*G06Q 10/06* (2012.01)
(Continued)

(52) U.S. Cl.
CPC .............. *G07C 5/0816* (2013.01); *B60K 35/00* (2013.01); *B60K 37/00* (2013.01); *B60W 30/04* (2013.01); *B60W 30/12* (2013.01); *B60W 30/16* (2013.01); *B60W 40/09* (2013.01); *B60W 50/14* (2013.01); *G06Q 10/06393* (2013.01); *G07C 5/0841* (2013.01); *B60K 2350/1092* (2013.01); *B60W 2050/0077* (2013.01); *B60W 2050/0089* (2013.01); *B60W 2050/046* (2013.01); *B60W 2530/14* (2013.01); *B60W 2550/308* (2013.01);
(Continued)

(58) Field of Classification Search
CPC ................ G07C 5/0841; B60W 40/09; G06Q 10/06393
See application file for complete search history.

(56) References Cited

U.S. PATENT DOCUMENTS 6,714,894 B1 3/2004 Tobey et al.
7,002,579 B2 2/2006 Olson
(Continued)

FOREIGN PATENT DOCUMENTS

EP 2236377 10/2010
EP 2320387 5/2011
(Continued)

OTHER PUBLICATIONS

"Cadec Rolls Out Major Product Update to "GYR" Expanding Performance Management Scorecards for PowerVue Customers", Market Wired Press Release, Jun. 26, 2013, 2 pages.

*Primary Examiner* — Todd Melton
(74) *Attorney, Agent, or Firm* — Hollingsworth Davis, LLC

(57) ABSTRACT

Systems and methods are directed to monitoring and assessing driver behavior. A system comprises an interface configured to receive vehicle data acquired by a computer system of a vehicle, a wireless transceiver configured to effect communications with a central office via one or more networks, a display, memory configured to store scoring algorithms, and a processor. The processor is configured to receive at least some of the vehicle data, and generate, in substantially real-time and independently from the central office, a plurality of scores for a plurality of scoring parameters using the stored scoring algorithms and the received vehicle data. The processor is also configured to update, in substantially real-time and independently from the central office, the plurality of scores during a predetermined period of time, and cooperate with the display to present the plurality of scores on the display during the predetermined period of time.

21 Claims, 11 Drawing Sheets

(51) Int. Cl.
  *B60W 50/14* (2012.01)
  *B60K 35/00* (2006.01)
  *B60K 37/00* (2006.01)
  *B60W 30/04* (2006.01)
  *B60W 30/12* (2006.01)
  *B60W 30/16* (2012.01)
  *B60W 50/00* (2006.01)
  *B60W 50/04* (2006.01)

(52) U.S. Cl.
  CPC ........ *B60W 2550/40* (2013.01); *B60W 2750/40* (2013.01)

(56) References Cited

U.S. PATENT DOCUMENTS

| | | |
|---|---|---|
| 8,090,598 B2 | 1/2012 | Bauer et al. |
| 8,311,858 B2 | 11/2012 | Everett et al. |
| 8,314,708 B2 | 11/2012 | Gunderson et al. |
| 8,989,959 B2 * | 3/2015 | Plante et al. ................ 701/33.4 |
| 2004/0153362 A1 | 8/2004 | Bauer et al. |
| 2007/0257804 A1 | 11/2007 | Gunderson et al. |
| 2007/0271105 A1 | 11/2007 | Gunderson et al. |
| 2008/0255722 A1 | 10/2008 | McClellan et al. |
| 2008/0319602 A1 * | 12/2008 | McClellan et al. ............. 701/33 |
| 2009/0024419 A1 | 1/2009 | McClellan et al. |
| 2010/0030586 A1 | 2/2010 | Taylor et al. |
| 2010/0157061 A1 | 6/2010 | Katsman et al. |
| 2010/0205012 A1 | 8/2010 | McClellan |
| 2010/0238009 A1 | 9/2010 | Cook et al. |
| 2010/0250021 A1 | 9/2010 | Cook et al. |
| 2011/0213628 A1 | 9/2011 | Peak et al. |
| 2011/0320492 A1 | 12/2011 | Inghelbrecht |
| 2012/0123806 A1 | 5/2012 | Schumann, Jr. et al. |
| 2012/0158436 A1 | 6/2012 | Bauer et al. |
| 2012/0226391 A1 | 9/2012 | Fryer et al. |
| 2012/0256770 A1 | 10/2012 | Mitchell |
| 2013/0046562 A1 | 2/2013 | Taylor et al. |
| 2013/0069803 A1 | 3/2013 | McCormick et al. |
| 2013/0073112 A1 * | 3/2013 | Phelan et al. .................... 701/1 |
| 2013/0096731 A1 | 4/2013 | Tamari et al. |
| 2013/0096815 A1 | 4/2013 | Mason et al. |
| 2014/0045147 A1 * | 2/2014 | Mohn et al. .................... 434/69 |

FOREIGN PATENT DOCUMENTS

| | | |
|---|---|---|
| WO | WO2005065997 | 7/2005 |
| WO | WO2010055509 | 5/2010 |
| WO | WO2012074935 | 6/2012 |

* cited by examiner

In Cab Scorecard - PFM Vehicle Settings

| Total Daily Scoring Thresholds | Yellow | Red |
|---|---|---|
| | 85 | 70 |

| | Yellow | Red | Points per Event |
|---|---|---|---|
| Sudden Stops | 2 | 4 | 2.0 |
| Sudden Starts | 2 | 4 | 2.0 |
| Long Idle Events | 2 | 4 | 3.0 |
| Over Speed Events | 3 | 5 | 2.0 |
| Excessive Speed Events | 1 | 2 | 4.0 |
| Stability Control Events | 2 | 3 | 4.0 |
| Forward Collision Events | 0 | 0 | 0.0 |
| Lane Departure Warning Events | 20 | 40 | 0.1 |
| Undock Movement Alarms | 1 | 2 | 3.0 |
| HOS Violations | 1 | 2 | 5.0 |

DRIVER SCORECARD SYSTEM AND METHOD

SUMMARY

Embodiments described in this disclosure are generally directed to systems and methods for monitoring and assessing driver behavior. Various embodiments are directed to a system comprising an interface configured to receive vehicle data acquired by a computer system of a vehicle, and a wireless transceiver configured to effect communications with a central office via one or more networks. The system also includes a display, memory configured to store scoring algorithms, and a processor. The processor is configured to receive at least some of the vehicle data, and generate, in substantially real-time and independently from the central office, a plurality of scores for a plurality of scoring parameters using the stored scoring algorithms and the received vehicle data. The processor is also configured to update, in substantially real-time and independently from the central office, the plurality of scores during a predetermined period of time, and cooperate with the display to present the plurality of scores on the display during the predetermined period of time.

Some embodiments are directed to a system comprising an interface configured to receive vehicle data acquired by a computer system of a vehicle, a wireless transceiver configured to effect communications with a central office via one or more networks, and one or more sensors configured for installation on the vehicle and to generate sensor data. The system also includes a display, memory configured to store scoring algorithms, and a processor. The processor is configured to receive at least some of the vehicle data and the sensor data, and generate, in substantially real-time and independently from the central office, a plurality of scores for a plurality of scoring parameters using the stored scoring algorithms and the received vehicle and sensor data. The processor is also configured to update, in substantially real-time and independently from the central office, the plurality of scores during a predetermined period of time, and cooperate with the display to present the plurality of scores on the display during the predetermined period of time.

Other embodiments are directed to a method comprising receiving vehicle data from a vehicle computer system, storing driver scoring algorithms at the vehicle, and generating, in substantially real-time and at the vehicle, a plurality of scores for a plurality of driver scoring parameters using the stored scoring algorithms and the received vehicle data. The method also comprises updating, in substantially real-time and at the vehicle, the plurality of scores during a predetermined period of time, and presenting the plurality of scores in a cab of the vehicle during the predetermined period of time.

In some embodiments, the method comprises storing, at the vehicle, user-selectable thresholds established for a fleet of vehicles and associated with at least some of the scoring parameters, and generating and updating the plurality of scores for the plurality of scoring parameters using the stored user-selectable thresholds, stored scoring algorithms, and the received vehicle data. In other embodiments, the method comprises receiving sensor data from one or more third-party sensors added to the vehicle, and generating, in substantially real-time and at the vehicle, at least some of the plurality of scores for at least some of the plurality of scoring parameters using the stored scoring algorithms and the received vehicle and sensor data. In further embodiments, the method comprises transmitting at least the plurality of scores for the predetermined period of time to a remote server.

These and other features can be understood in view of the following detailed discussion and the accompanying drawings.

BRIEF DESCRIPTION OF THE DRAWINGS

FIGS. 2-5 illustrate various screens of scorecard information presented by an in-cab driver scorecard system in accordance with various embodiments;

FIGS. 6 and 7 are representative reports that can be generated using scorecard information developed by an in-cab driver scorecard system according to various embodiments;

DETAILED DESCRIPTION

Figure 1:
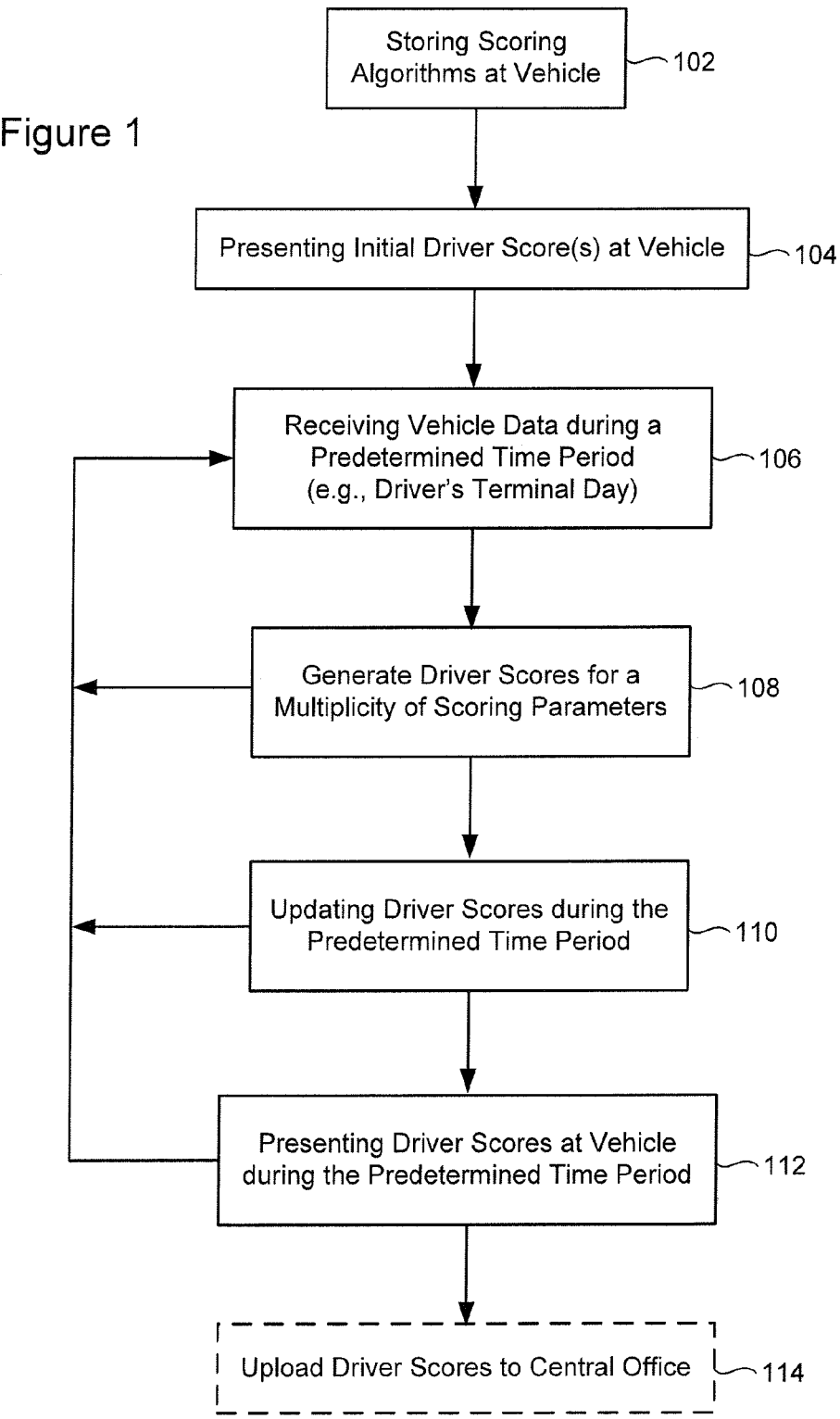
FIG. 1 is a flow chart illustrating various processes involving the development and presentation of an in-cab driver scorecard in accordance with various embodiments.

Embodiments of the disclosure are directed to a system and method of assessing driver behavior and providing timely feedback on such behavior to the driver. Embodiments of the disclosure are directed to a system and method of assessing driver behavior for a multiplicity of vehicles, such as a fleet or fleets of commercial vehicles. Embodiments of the disclosure are directed to a system and method of monitoring for specified driving behaviors considered to be undesirable or unsafe, quantifying the magnitude of infractions or penalties due to undesirable or unsafe driving behaviors, computing a score for each of the specified driving behaviors that occur during a predetermined period of time, and computing a total driving score for the predetermined period of time. These processes are implemented for each of a multiplicity of drivers during a predetermined period of time that may be unique to each driver. It is noted that the predetermined period of time need not necessarily be unique to each driver, nor need it be consistent across all drivers. Scoring data and other data is preferably communicated to a central office, which provides multi-user access to driver scoring data.

In accordance with various embodiments, a driver scoring methodology of the present disclosure involves allocating an initial score of driving points to a particular driver at the beginning of the driver's work day (more particularly, the driver' "terminal day" which is described hereinbelow). For example, a driver is given 100 points at the beginning of each workday, which is lowered by the in-cab scoring system by committing safety or performance infractions. The amount of points the score is lowered by is defined by the customer or user of the system, such as a fleet owner or a transportation company for example. In various embodiments, a driver grade is also provided in addition to a driving score, which is preferably indicated by a color scheme involving green (good), yellow (acceptable or OK), and red (poor). It is understood that other driver grading schemes are contemplated, such as a letter or graphic icon grading scheme. Customers are able to choose the scoring parameters they wish to evaluate drivers against from a preestablished list of possible scoring parameters. The customer is provided rights to establish how many points each driving incident is worth for each scoring parameter, and what point count signifies a change from one driver grade to another (e.g., a transition from a green driver grade to a yellow driver grade).

According to various embodiments, a particular driver's current daily driving score is made visible on an in-cab monitor or display, which is readily viewable by the driver in the form of a driver's scorecard. When the vehicle is being operated (e.g., in an operating status other than park), a driver's scorecard is presented in summary fashion, and that only a limited amount of scoring information is presented on the in-cab monitor for safety reasons. The summary information preferably includes the current daily driving score both in terms of a number of points and as a colored bar or other indicia of the current driver's grade. When the vehicle is not currently being operated, the driver has access to more detailed scoring information. For example, an in-cab scorecard details screen can show the current day's count of occurrences and point deductions by individual scoring parameter, as well as scoring parameter thresholds and current driver grades for each scoring parameter. An in-cab scorecard history screen can be presented to the driver which shows a history of the last 14 days' of scores in addition to scores for the current day, for example. An in-cab scorecard system can receive multiple driver information from a central office, and present average scores on the in-cab display of each of the scoring parameters derived from the multiple driver information.

A number of reports can be generated using driver scoring data received by the central office. Authorized users can access the central office to produce a summary report that shows an average point score of driving incidents by parameter for an individual driver or groups of drivers for a desired reporting period (e.g., multiple days rolled up into a single line per driver). Various detailed driver scorecard reports may also be generated. For example, a detailed report provides data on an individual driver score for each day within a desired reporting period (e.g., one line per day, one driver per report).

FIG. 1 is a flow chart illustrating various processes involving the development and presentation of an in-cab driver scorecard in accordance with various embodiments. According to the embodiment shown in FIG. 1, one or more scoring algorithms are stored 102 at a vehicle to be operated by a particular driver. Upon initiating a specified driving assignment, and initial driver score or scores are presented 104 for viewing at the vehicle by the driver. For example, an initial driver score or scores are presented in the cab of the vehicle for easy viewing by the driver. Various forms of vehicle data are received 106 during a predetermined time period, such as for the duration of the driving assignment defined by start and end times. According to various embodiments, the predetermined time period during which vehicle data is received and driver scoring is performed is referred to as the driver's terminal day. A terminal day refers to a predetermined period of time during which a particular driver is operating one or more vehicles. For example, a terminal day may be defined as a 24 hour period (e.g., any 24 hour period, not necessarily correlating to a midnight to midnight calendar day) that may apply to a single vehicle or across multiple vehicles with the same driver. By way of further example, a terminal day may be defined as a 23 or 25 hour period that may apply to a single vehicle or across multiple vehicles with the same driver, depending on the applicability of Daylight Savings Time.

The method shown in the representative embodiment of FIG. 1 further involves generating 108 driver scores for a multiplicity of scoring parameters. The scoring parameters are typically predetermined vehicle performance and/or driver behavior parameters which are monitored during the predetermined time of vehicle operation. Each of the scoring parameters is typically associated with a specified driving event which is to be monitored. When a specified driving event occurs, the scoring parameter or parameters associated with the specified driving event subject to monitoring are used as a basis for generating driver scores for the specified driving event. Monitoring for the specified driving events and updating 110 driver scores continues during the predetermined time. After detection of each specified driving event and updating 110 of driver scores, the updated driver score or scores are presented 112 at the vehicle, such as in the cab for easy viewing by the driver. According to various embodiments, the driver scores and optionally other information such as vehicle data are uploaded 114 to a central office (e.g., remote server).

FIG. 2 illustrates a vehicle settings screen 200 of an in-cab scorecard system that can be presented on a display in the cab of a vehicle in accordance with various embodiments. According to various embodiments, the in-cab scorecard system includes a touch screen display of an on-board computing device which is communicatively coupled to a computer system of the vehicle. The on-board computing device preferably includes a transceiver configured to facilitate wireless communication with a central office, such as via cellular, satellite, and ground-based communication systems. The on-board computing device may also be coupled to one or more sensors provided at the vehicle that are coupled to the on-board computing device directly or indirectly via the vehicle's computer system or communication bus.

Figure 3:
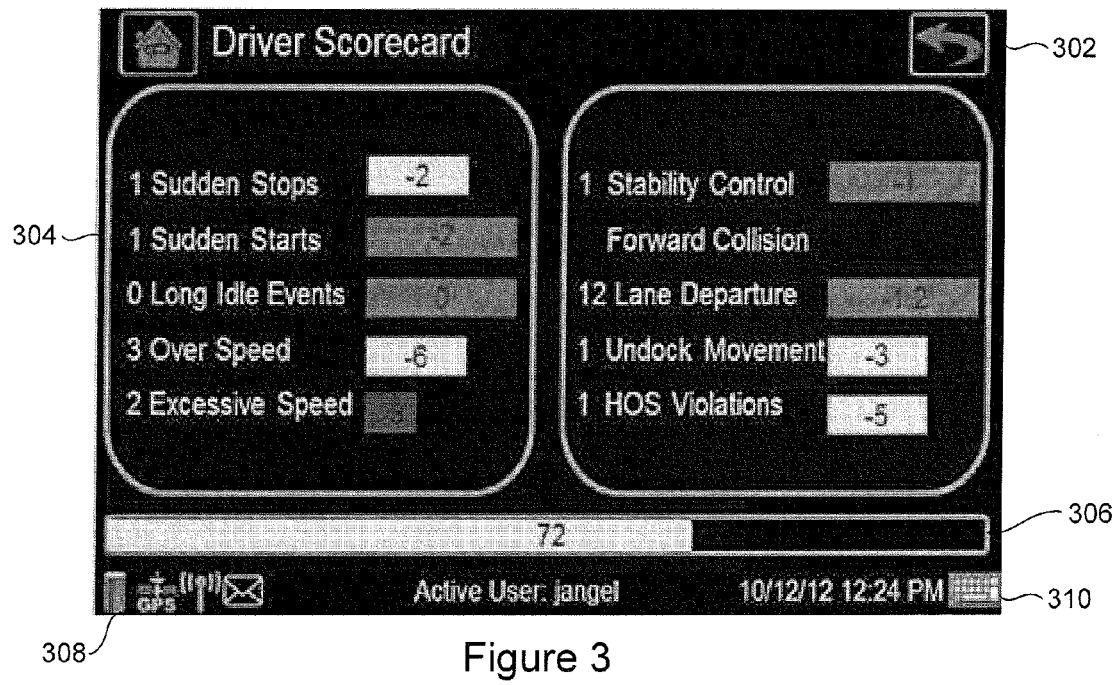
Figure 4:
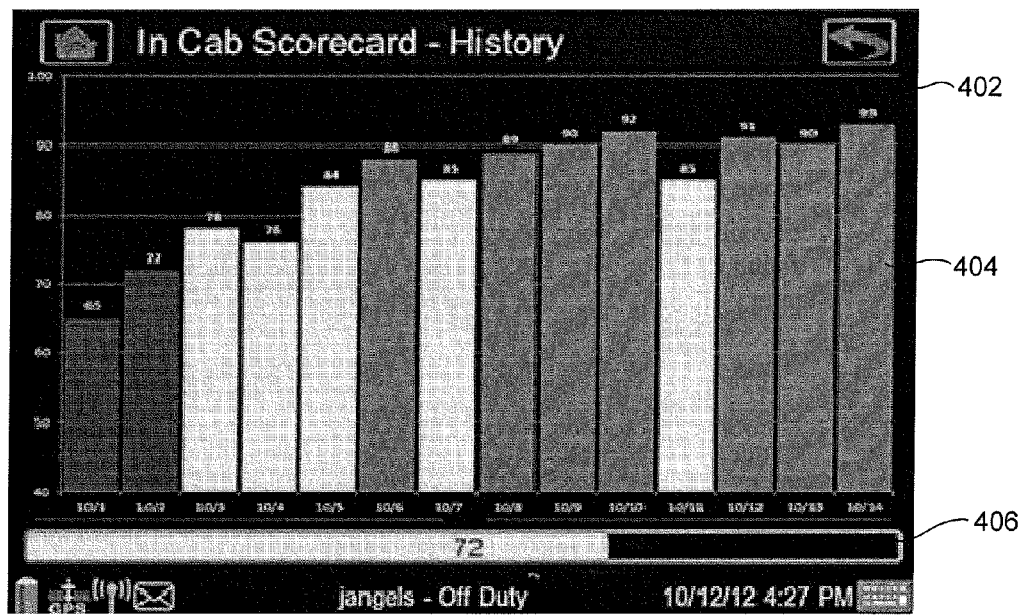
Figure 5:
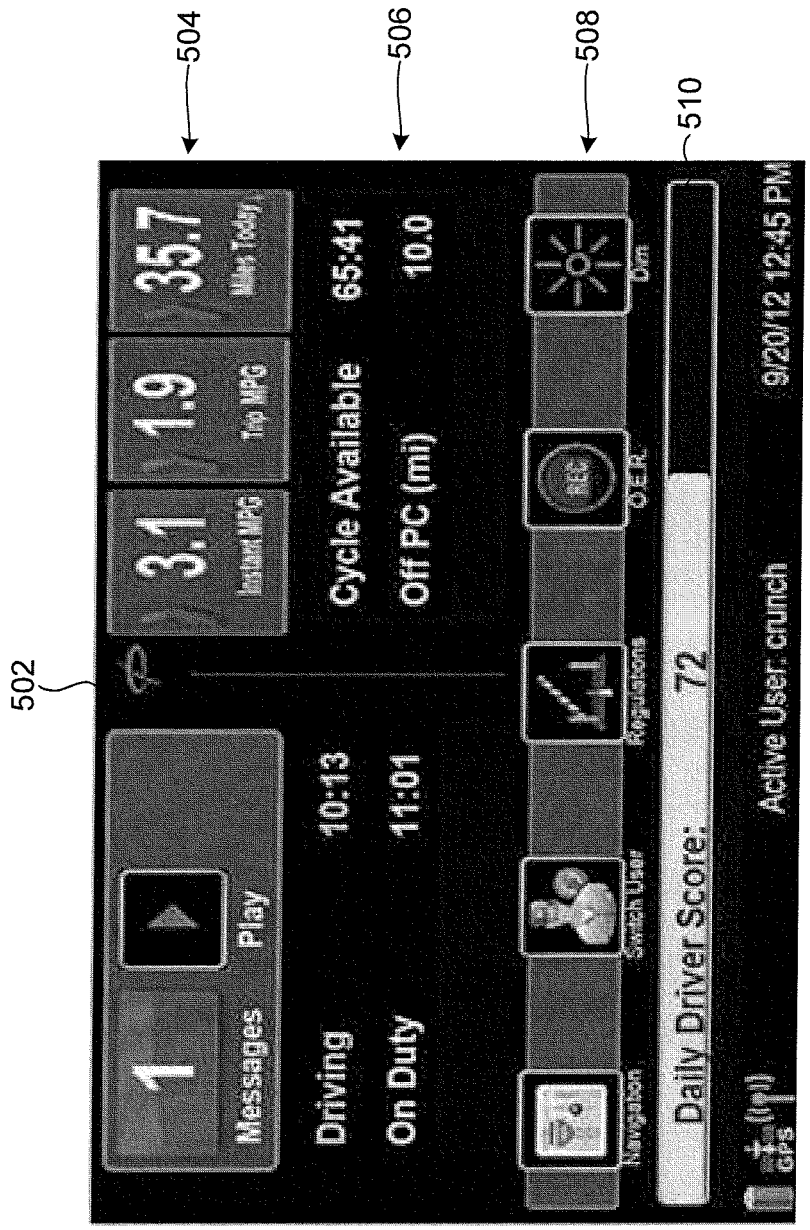

The vehicle settings screen 200 of FIG. 2 shows various scoring thresholds and scoring parameters that are used to generate an in-cab scorecard of the type illustrated in FIGS. 3-5. A first region 204 of the vehicle settings screen 200 shows total daily scoring thresholds associated with two driver grades, yellow (e.g., acceptable) and red (e.g., poor). Although not shown explicitly, a third driver grade of green (e.g., good) is used to denote good driving behavior above that indicated by a driver grade of yellow. In general, the total daily scoring thresholds are associated with a predetermined level of driver performance. A second region 206 of the vehicle settings screen 200 shows a multiplicity of scoring parameters, driver grades associated with each scoring parameter, and points per event values associated with each scoring parameter. According to various embodiments, an initial total daily driver score of 100 points is established for the driver at the beginning of a specified driving assignment (e.g., a driver's terminal day). Although not shown in FIG. 2, an initial driver grade of green (e.g., good) is presented on the in-cab scorecard along with the initial total daily driver score of 100 points upon initiating the specified driving assignment. As shown in FIG. 2, a driver grade of yellow is associated with a total daily scoring threshold of 85, and a driver grade of red is associated with a total daily scoring threshold of 70.

During the driver's driving assignment (e.g., terminal day), each time a driving event being monitored occurs in which one or more scoring parameters are implicated, point deductions are calculated and the total daily driver score is reduced by the calculated point deductions. When the total daily driver score reaches the threshold of 85 points, the driver grade transitions from green (good) to yellow (acceptable). As additional driving events occur within the driver's driving assignment or terminal day, the total daily driver score is further reduced by additional calculated point deductions. When the total daily scoring threshold of 70 is reached, the driver grade transitions from yellow (acceptable) to red (poor). It is understood that the total daily scoring thresholds of 85 and 70 respectfully associated with driver grades of yellow and red can be adjusted on a per driver basis, per group basis, per fleet basis, per geographic region or other basis.

As is further shown in the embodiment of FIG. 2, ten different scoring parameters are defined for scoring a driver and generating an in-cab scorecard in accordance with various embodiments. Although ten scoring parameters are shown in FIG. 2, it is understood that any number of scoring parameters (e.g., more or less than the 10 shown in the figures) may be established, monitored, and displayed according to various embodiments. The representative scoring parameters shown in FIG. 2 include sudden stops, sudden starts, long idle events, over speed events, excessive speed events, stability control events, forward collision events, lane departure warning events, undock movement alarms, and hours of service (HOS) violations. Each of these scoring parameters has an associated driver grade (e.g., green, yellow, red) threshold and points per event deduction value. Generally, the magnitude of the points per event deduction value increases for more serious (e.g., dangerous) driving behavior and decreases for less serious driving behavior. Similarly, the scoring parameter thresholds demarcating green, yellow, and red driver grades are lower in terms of number of occurrences for more serious driving behavior and higher for less serious driving behavior.

For example, after detecting driving points for a total of one excessive speed event, the driver grade for excessive speed transitions from green to yellow. After detecting driving points for a total of two excessive speed events, the driver grade for excessive speed transitions from yellow to red. For these excessive speed events, the driver receives a point deduction of 4.0 for each excessive speed event, which is deducted from the driver's total daily score. By way of further example, after detecting a total of 20 lane departure warning events, the driver grade for this scoring parameter transitions from green to yellow. After detecting a total of 40 lane departure warning events, the driver grade for this scoring parameter transitions from yellow to red. For each of these lane departure warning events, the driver receives only a 0.1 driving point deduction, which is deducted from the driver's total daily score. It can be appreciated that the number, type, grading, and points per event values associated with scoring parameters of an in-cab scorecard system and method can differ from those shown in FIG. 2 and discussed herein.

FIG. 3 illustrates an in-cab scorecard 302 that is generated at a vehicle in accordance with various embodiments. In various embodiments, the scorecard 302 shown in FIG. 3 is generated in real-time and updated continuously during a driver's terminal day. The scorecard 302 is preferably presented on a display of an on-board computing device provided at the vehicle. The scorecard 302 shown in FIG. 3 includes a main display region 304 within which individual scorecard parameters and associated driving event counts are presented for viewing by driver, typically in the cab of the vehicle. For each of the individual scorecard parameters presented in the main display region 304, the current driver grade color (e.g., green, yellow, red) is superimposed over the event count. In this manner, the driver is given real-time feedback as to his or her current driving behavior and an associated visual cue (e.g., driver grade color) for each of a multiplicity of scoring parameters that impact the driver's overall total driving score.

In the embodiment shown in FIG. 3, the in-cab scorecard 302 includes region 306 within which the driver' current total driving score of the terminal day is presented. The region 306 includes both a numeric score value indicating the current total daily driver score as well as a color indicator indicating the current driver grade. In this illustrative example, the current driver, shown as "Active User: jangel," has a total daily score of 72 and a current driver grade of yellow (e.g., acceptable or OK). It is noted that, upon initiating the driver's terminal day, the region 306 is initialized with a driver grade of green (e.g., good) and a total daily score of 100. The current total daily score of 72 shown in FIG. 3 is a result of point deductions resulting from the driving event penalties shown in the main display region 304.

The in-cab scorecard 302 shown in FIG. 3 includes various other icons and regions of interest. At the top of the scorecard 302, a return home icon and a previous screen icon are provided, both of which are actuatable by the driver via the touchscreen of the in-cab display (typically during non-operating times, such as when the vehicle is in park). Current date and time may also be presented on the scorecard 302, as well as a status bar 308 and a keyboard control 310. The status bar 308 provides information concerning various components of the in-cab computer system, including battery status, GPS conductivity status, cellular or satellite connectivity status, and email or messaging status. The keyboard control 310 can be activated to facilitate driver interfacing with the in-cab computing device via the touch screen display. It is noted that the keyboard control 310 and other icons and information are typically not presented nor are in active while the vehicle is moving, but can be enabled for usage with the vehicle in a parked status, for example.

FIG. 4 is an illustration of an in-cab scorecard histogram screen 402 that can be displayed for driver review. According to the embodiment shown in FIG. 4, the scorecard histogram screen 402 presents a predetermined number of daily driver scores (e.g., 14 days) attributed to a particular driver. In this illustrative example, a histogram of the past 14 days of driver scores is presented. For each daily score, the driver's total daily score 404 and associated driver grade color (green, yellow, red) is presented in bar chart form. It can be appreciated that the number of days constituting the histogram and the presentation format of the histogram information can be presented in a variety of ways. In the representative scorecard histogram shown in FIG. 4, in addition to the previous 14 days of driver scores being presented, the current total driver score and driver grade color is presented in a region 406 of the histogram screen 402.

FIG. 5 shows an in-cab scorecard screen 502 that provides additional information for a driver's current terminal day. The in-cab scorecard screen 502 shown in FIG. 5 is a representative embodiment of a "safe mode" screen, which can be presented to the driver when the vehicle is in operation. The additional information screen 502 includes a number of information regions and driver actuatable buttons. In the illustrative embodiment shown in FIG. 5, the additional information screen 502 includes a button region 504 in which information and actuatable buttons are presented. The button region 504 includes a message button that indicates the number of incoming messages received and a playback button that allows the driver to play one or more of the incoming messages. The button region 504 further includes various details of the driving assignment associated with the driver's terminal day. For example, "Instant MPG" and "Miles Today" buttons and associated information are provided in the button region 504. A "Trip MPG" button is also provided in the button region 504, which is only cleared when the driver chooses to clear in-cab engine data (e.g., like a trip odometer in a car). "Trip MPG" is therefore not generally associated with a single terminal day unless the driver manually chooses to do so (such as by clearing the in-cab engine data, e.g., Trip MPG data). Activating any of these buttons provides additional details concerning the summary information presented for each button.

A main region 506 of the additional information screen 502 shows total driving time and total on-duty time (e.g., HOS) for the driver's terminal day. Other information presented in the main region 506 includes cycle time available information and off PC information. Cycle time available is another of the driver's HOS calculations. For example, when running 60/7, the driver can only drive until total on-duty time (On Duty+ Driving) equals 60 hours in the last 7 days (e.g., today+6). Off PC refers to Off Duty Personal Conveyance. This is a special category of Off Duty, where the vehicle can be driven without counting as On Duty Driving time, because the driver is driving home, for example (thus personal conveyance). It is noted that there is no exact maximum distance that is regulated (e.g., such as by Department of Transportation officers who enforce Off Duty PC miles), and there are many interpretations of what is valid PC distance based on factors weighed by individual officers enforcing it.

An applications region 508 of the additional information screen 502 provides a number of driver actuatable application buttons. For example, the applications region 502 includes buttons for activating various applications and functions, such as a Navigation or Maps application, a Switch Users button, a Regulations function, an Onboard Event Recorder (O.E.R.) facility, and a panel dimming button (Dim). The Navigation application button, for example, allows the driver to activate a mapping application. The Switch User button allows the driver or co-driver in a team driving situation to change which driver's information is shown in the main region 506. The Regulations button allows drivers to manually switch HOS regulations, for example at a border crossing from the United States into Canada (or vice versa). The Dim button switches to Bright when minimum brightness is reached, and the two buttons allow for cycling between various brightness levels.

The Onboard Event Recorder button activates a facility that initiates capturing of detailed information concerning a current or recently occurring driving event. The Onboard Event Recorder button initiates collection of a vehicle data and, if available, vehicle sensor data temporally surrounding a driving event. For example, detailed vehicle and sensor data may be collected and stored for the predetermined duration preceding and following the driving event. The collected driving event data is preferably communicated to a central office for analysis and, if appropriate, a response from a manager having access to the driver's data via the central office. Region 510 provides a summary of the driver's current score and grade. It is noted that activating the Switch User button controls which user's scorecard information is displayed, including the driver's current score and grade presented in region 510.

According to various embodiments, an onboard scorecard system includes memory configured to store one or more display templates each defining a predetermined graphical layout, such as those illustrated in FIGS. 2-5. A processor of the onboard scorecard system is configured to cooperate with the display to present the driver score information in a scorecard format on the display using selected ones of the stored display templates. Local storage and usage of predetermined graphical layouts for the various scorecard screens allows such layouts to be tailored for the specific display of the onboard scorecard system, ensuring proper display of pertinent scorecard information at all times.

Figures 6, 7:
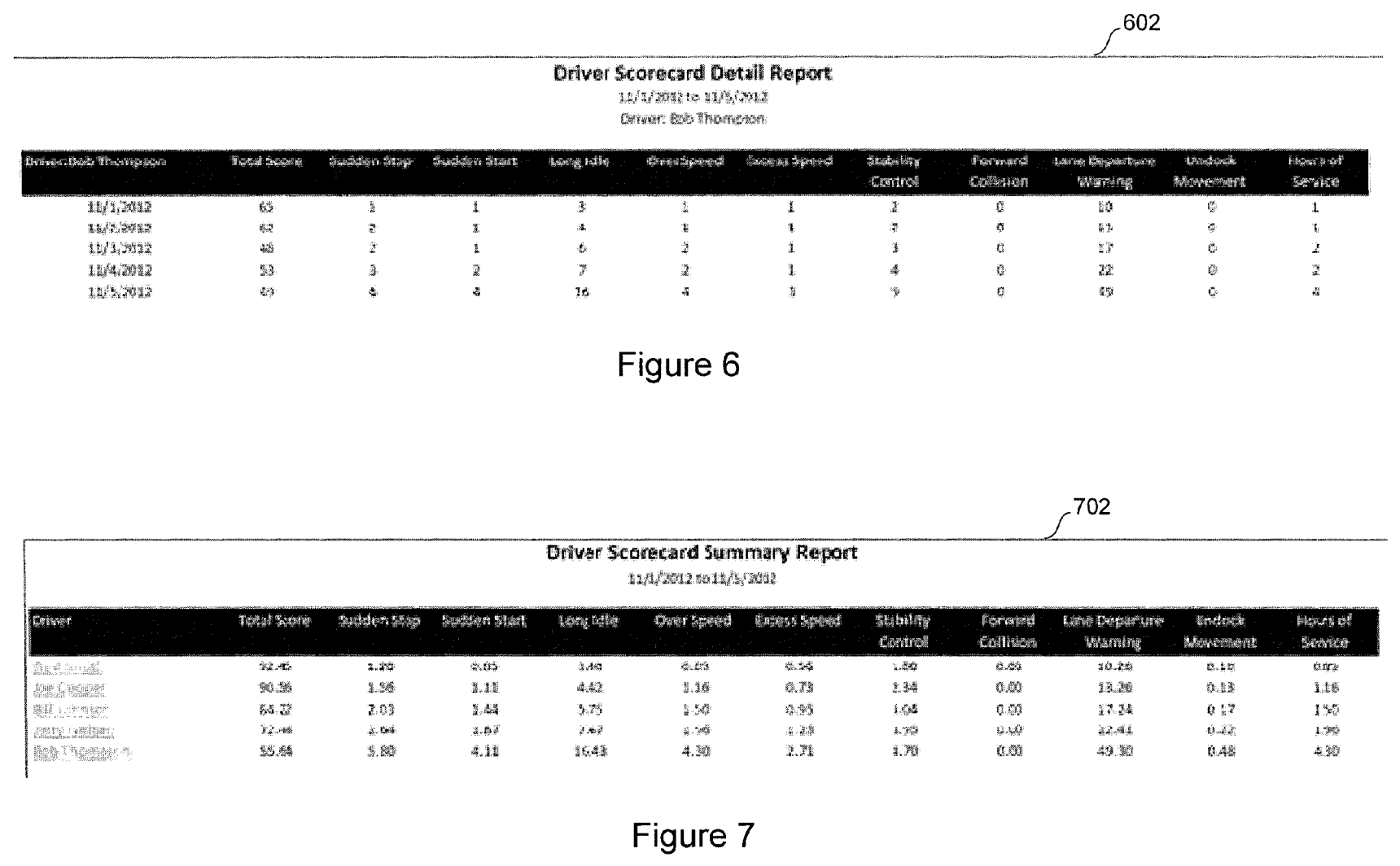

Turning now to FIGS. 6 and 7, these figures show different informational reports that can be generated using the data acquired in connection with an in-cab scorecard methodology according to various embodiments. It is understood that the representative reports shown in FIGS. 6 and 7 are provided for purposes of illustration and not of limitation, and that other types of reports, including different report formats and information presented therein, can be presented, displayed, printed or otherwise reproduced. FIG. 6 shows a representative driver scorecard detail report 602 for a particular driver, in this case Bob Thompson. The detail report 602 lists in tabular form pertinent scorecard parameter information and driver event data for a multiplicity of driving days for the driver. FIG. 7 is a representative driver scorecard summary report 702, which spans a specified number of days and presents driving data for a multiplicity of individual drivers. The summary report allows for a comparison between a multiplicity of drivers in terms of total daily scores and individual scorecard parameter driving events. The reports shown in FIGS. 6 and 7 can be presented on a display at a remote location and/or generated in printed form.

Figure 8:
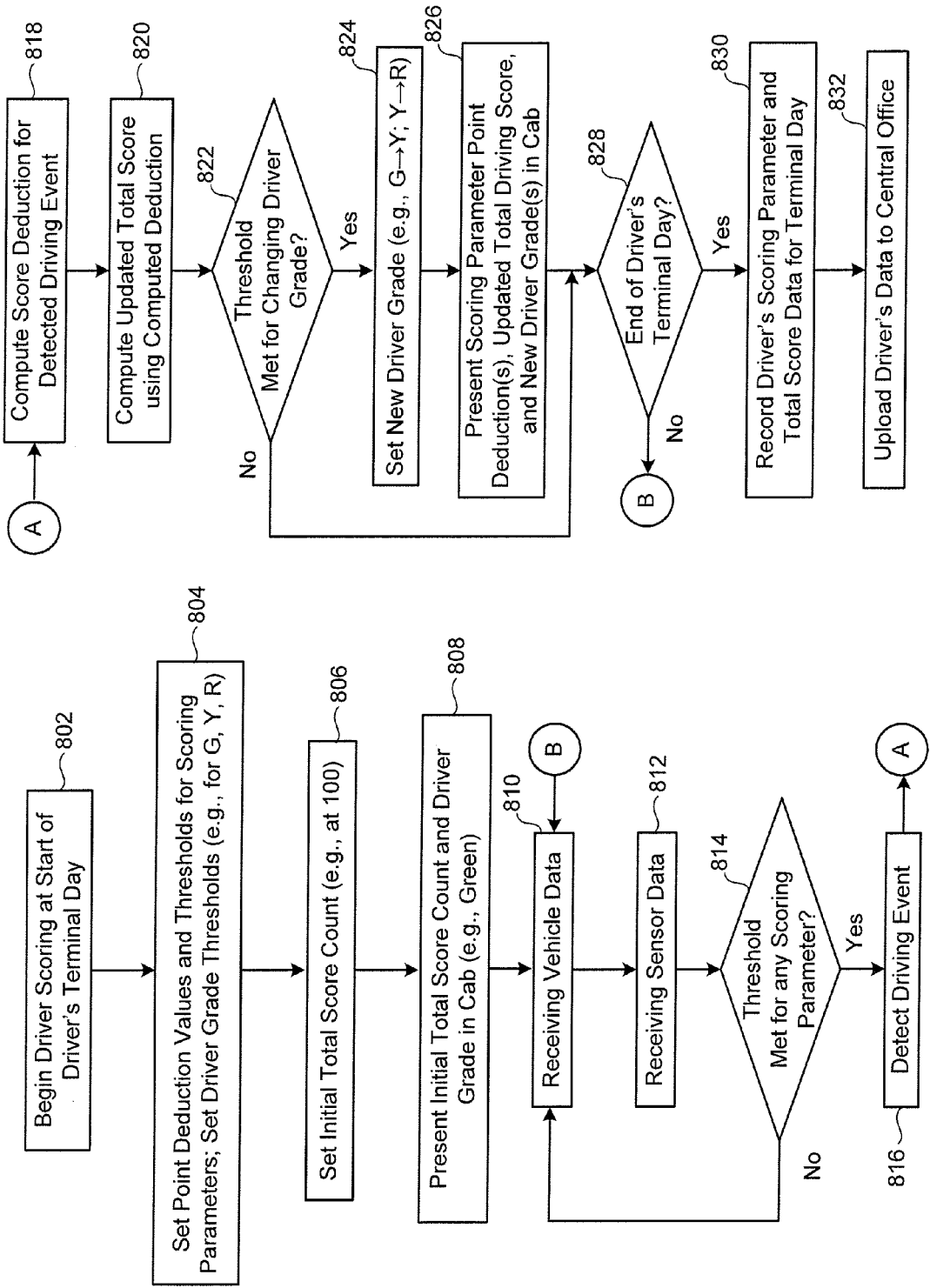
FIG. 8 is a flow chart illustrating various processes involving the development and presentation of an in-cab driver scorecard in accordance with various embodiments.

FIG. 8 is a flow chart showing various processes involving an in-cab driver scorecard methodology in accordance with various embodiments. The method shown in FIG. 8 is initiated 802 at the start of a driver's terminal day. At the start of a driver's terminal day, various scorecard parameters are initialized. For example, a point deduction values and thresholds for each of the multiplicity of scoring parameters are set to specified initial values, respectively. Initial settings for driver grade thresholds are also set 804 at the beginning of the driver's terminal day. The initial total driving score count is set 806 at a predetermined value, such as 100 in accordance with this representative embodiment. The initial total score count and driver grade are presented 808 in the cab for driver viewing. For example, the driver's initial total score count of 100 and a driver grade of green are presented in the cab at the beginning of the driver's terminal day.

The driver scoring methodology illustrated in FIG. 8 involves receiving 810 vehicle data from the vehicle's computer or communication bus. The vehicle data received for purposes of driver scoring includes information associated with the scoring parameters that are monitored and driving events which occur during the driver's terminal day. According to some embodiments, in addition to receiving vehicle data 810, various types of sensor data can be received 812 for monitoring one or more scoring parameters that cannot be assessed using data acquired from a vehicle computer or indication bus. Sensor data, for example, can be acquired by one or more third-party sensors that are added to the vehicle (e.g., not typically built into the vehicle during manufacture). The vehicle data and sensor data are received 810, 812 and processed preferably in real-time throughout the driver's terminal day.

As the vehicle and sensor data is received and processed by the on-board computing device, these data are compared to thresholds established for the various scoring parameters from which a driver's in-cab scorecard is generated. If, during the process of continuously comparing vehicle and sensor data to scoring parameter thresholds, a threshold is met for any of the scoring parameters 814, a driving event is detected 816 and/or declared. It is noted that a particular driving event may implicate one or several scoring parameters. In response to the test at block 814, score deduction or deductions are computed 818 for the detected driving event. An updated total score is computed 820 using the score deduction computed in block 818. The process of computing score deductions and updating total scores 818, 820 is performed for each scoring parameter implicated in the detective driving event.

In addition to changing individual scoring parameter point counts and a driver's total daily score in blocks 818 and 820, the methodology shown in FIG. 8 further includes determining whether a threshold is met 822 for changing a driver grade for an individual scoring parameter and/or the driver's total daily score. If a driver grade threshold has been met 822, a new driver grade for the implicated scoring parameter and/or total daily score is set 824, such as by transitioning the driver grade color from green to yellow or yellow to red. The updated and changed information resulting from the detected driving event is presented 826 in the cab for viewing by the driver. For example, the scoring parameter point deduction(s), updated total driving score, and new driver grade(s) are presented 826 in the cab.

While the vehicle is in motion, a subset of available scoring information is presented in the vehicle cab so as not to unduly distract the driver. For example, the available in-cab scorecard data presented to the driver during operation of vehicle may be limited to the total daily driving score (e.g., 88) and associated driver grade (green). In response to a detected driving event while driving the vehicle, the driver can assess the impact of the driving event by viewing any change to the numerical score or driver grade color. In some embodiments, the system may notify the driver of the event using a variety of methodologies different from, or in addition to, an update in driving score and driver grade. For example, occurrence of, and information about, a driving event can be communicated to the driver by a display of symbols, indicia, and/or graphics indicating a positive or negative change in score or grade and/or an audible indication of score or grade change, such as by a verbal message produced using an automated voice program. The mode of presenting limited summary in-cab scorecard information during operation of the vehicle is referred to herein as a "safe mode." It is understood that the type, amount, and format of scorecard information presented to the driver while operating in a safe mode can vary from that described herein depending on various factors, including the type of vehicle being operated, experience of the driver, road conditions, and other safety and driving related factors.

The driver scoring methodology shown in FIG. 8 preferably runs continuously during the driver's terminal day. The driver scoring methodology runs during the driver's terminal day in cases where a particular driver operates the same vehicle or a number of different vehicles during the particular driver's terminal day. When the end of the driver's terminal day has been reached 828, the driver's scoring parameter and total score data for the terminal day are recorded 830. In order to support transferring in-cab scorecard information from one vehicle to the next within a particular driver's terminal day, recording 830 of current scoring parameters and total score data can be accomplished without the ending of the particular driver's terminal day (e.g., the particular driver can log out of the system without the particular driver's terminal day ending). However, recording 830 of current scoring parameters and total score data can also occur at the end of the particular driver's terminal day in the event that he or she continues driving from one terminal day to the next (e.g., drives from 8 AM to 5 PM, but the particular driver's terminal day ends at noon-4 hours on terminal day 1, 5 hours on terminal day 2). In addition, other data such as vehicle data and sensor data can be recorded and associated with the driver's scoring information for the terminal day. The driver's data is preferably uploaded 832 to a central office.

A scorecard system and methodology of the present disclosure solves a problem of inconsistencies between in-cab and central office scorecard data experienced using conventional approaches. It can be appreciated that drivers and fleet managers rely on accurate driver scorecard data for evaluating driver/fleet performance and safety. Because driver scorecard data of the present disclosure is captured during a particular driver's terminal day and then uploaded to the central office at the conclusion of the particular driver's terminal day, synchronicity (consistency) between the in-cab scorecard data for each driver/vehicle and the central office data is ensured.

For example, the central office server(s) maintain the various scoring parameter thresholds, driver grade thresholds, and driving event detection thresholds as established by the customer (e.g., fleet manager) or as default values. When a particular driver logs into the central office, such as at the start of the driver's terminal day, these threshold data (and any algorithm or software updates) are compared against those stored in the in-cab computing device and updated accordingly. As such, the scoring algorithms and software in-cab computing device match those at the central office at the start and end of the driver's terminal day. It is understood that a threshold(s) or scoring algorithm can be changed for a given driver/fleet at the central office, and that such changes will be synchronized with the in-cab computing device, typically at logout for the current terminal day or at login of the driver's next terminal day.

In some embodiments, the central office comprises a processor configured to receive vehicle data (and optionally sensor data) from the processor of the in-cab computing device and compute, for the driver's terminal day, scores for the applicable scoring parameters using resident scoring algorithms and the received vehicle/sensor data. Scores and grades from individual and multiple drivers can be computed and displayed on one or more displays at the central office. Because synchronicity of scorecard thresholds, algorithms, and software is maintained between the central office and in-cab computing device(s), the updated scores of the in-cab processor match the scores computed at the central office.

According to various embodiments, driver scorecard data can be imported to a scorecard system managed by a customer, such as a fleet owner. Driver scorecard data generated in accordance with embodiments described herein can be incorporated into a customer scorecard that provides comprehensive information concerning the customer's fleet. The content and format of driver scorecard data to be incorporated into a customer's fleet scorecard can be selected so that driver scorecard data can be readily imported with minimal or no human preprocessing of the data. For example, the central office comprises an interface through which a third party server can access stored driver scorecard data and import such data in a format suitable for incorporation into a fleet or other scorecard producible by the third party server. The ability to collect and export individual driver scorecard data for incorporation into a customer's fleet scorecard addresses a need heretofore unmet by conventional approaches.

Figure 9:
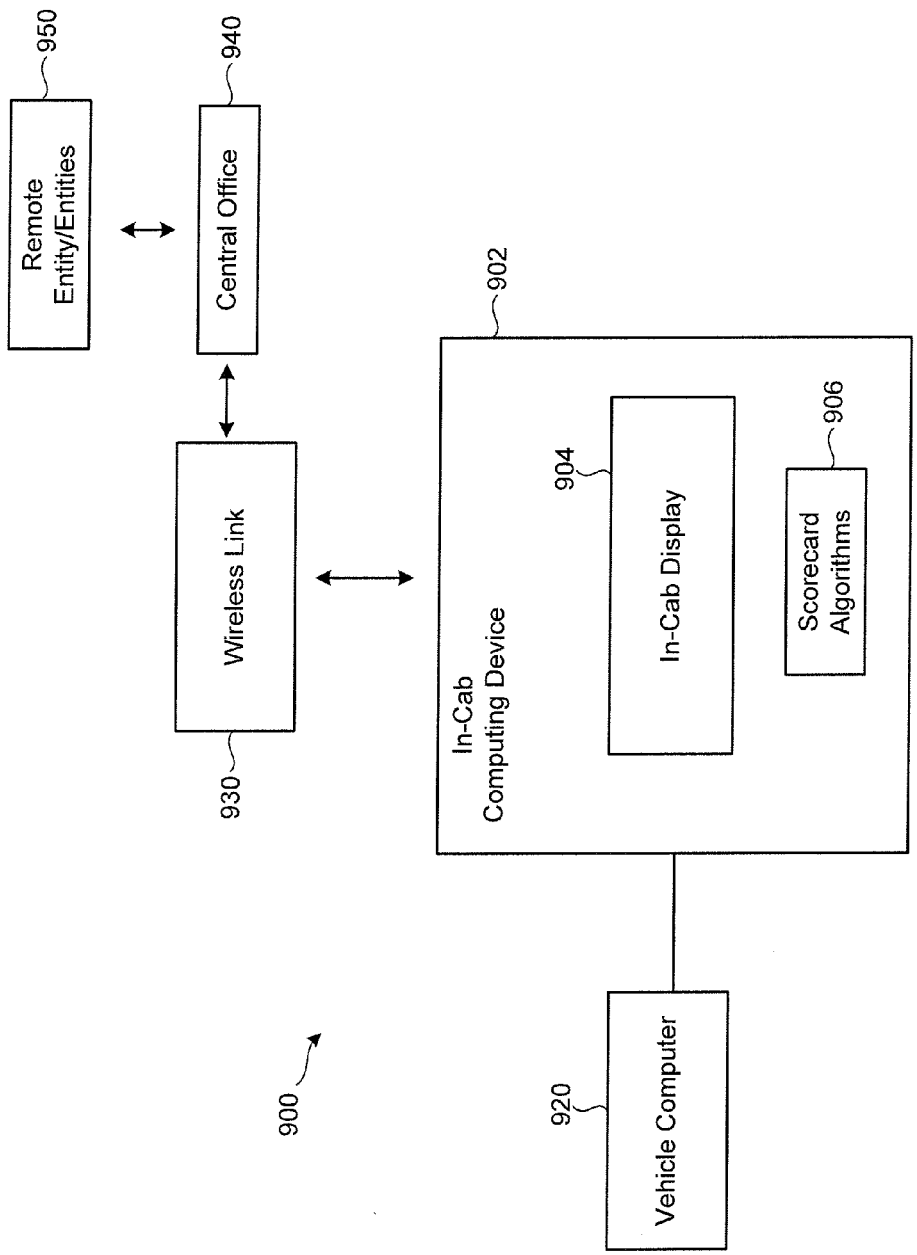
FIGS. 9-13 are block diagrams of various components and system configurations for implementing an in-cab driver scorecard methodology in accordance with various embodiments.

FIG. 9 is a block diagram of a system 900 for implementing an in-cab driver scoring methodology in accordance with various embodiments. According to the representative embodiment of FIG. 9, the system 900 includes an in-cab computing device 902 which is provided at the vehicle. Among various components, the in-cab computing device 902 includes an in-cab display 904, which is mounted in the vehicle cab (e.g., fixedly or as a removable handheld device) and scoring algorithms 906 stored in a memory of the in-cab computing device 902. The in-cab computing device 902 is communicatively coupled to a vehicle computer 920, which is typically the information hub of the vehicle, and also to a central office 940 via one or more communication links, such as a wireless link 930. Connectivity between the in-cab computing device 902 and the central office 940 may involve a number of different communication links, including cellular, satellite, and land-based communication links. The central office 940 provides for connectivity between one or more remote entities 950 (e.g., authorized users, such as fleet managers) and scorecard information and other data residing on one or more servers of the central office 940.

Figure 10:
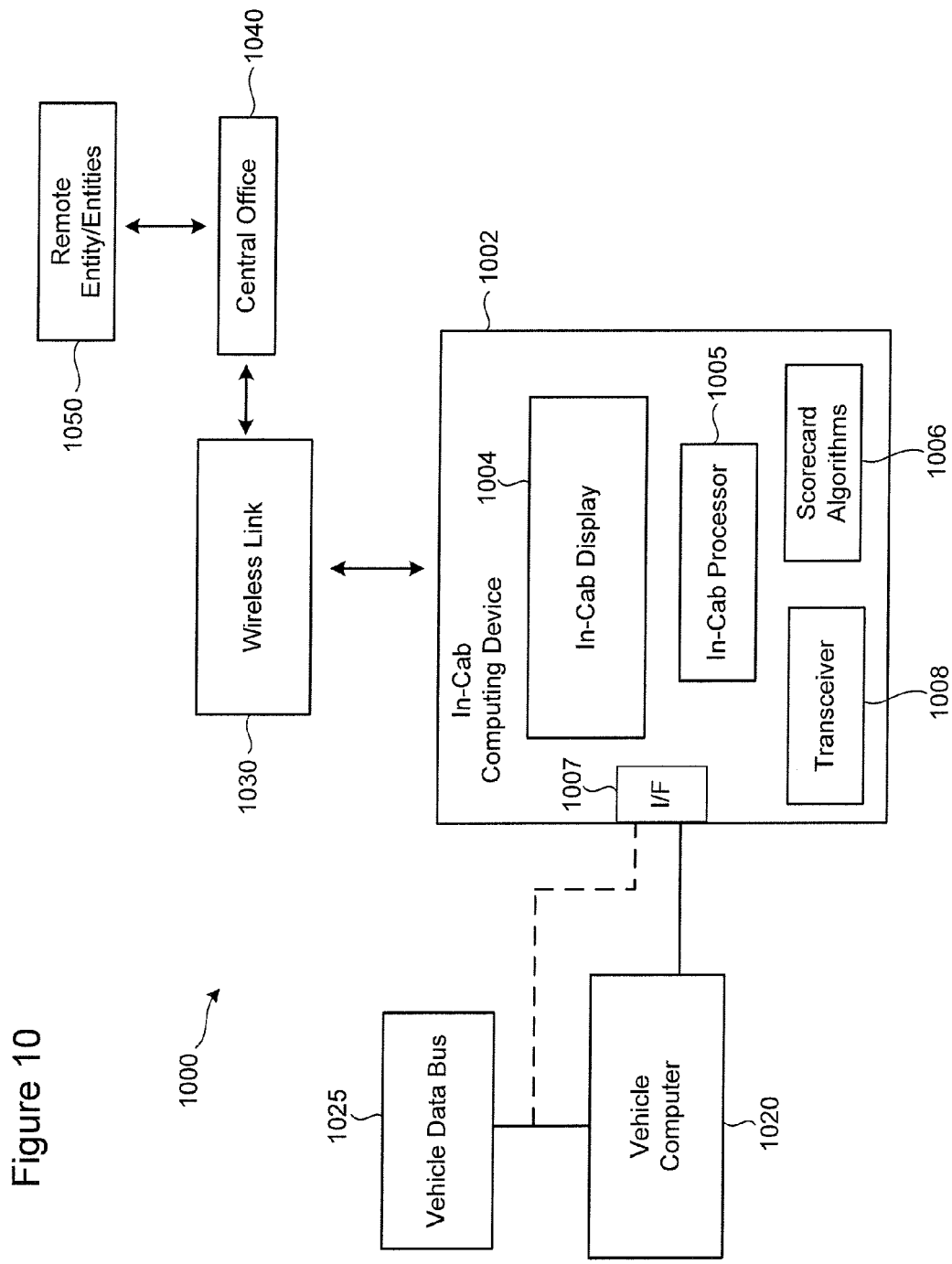

FIG. 10 is a block diagram of the system 1000 for implementing an in-cab driver scoring methodology in accordance with various embodiments. In the representative embodiment shown in FIG. 10, the system 1000 includes an in-cab computing device 1002 communicatively coupled to a vehicle computer 1020 via an interface 1007 and to a central office 1040 via a wireless link 1030. The central office 1040 is communicatively coupled to one or more remote entities 1050 and to the in-cab computing device 1002 via a cellular link, satellite link and/or a land-based link (e.g., via the Internet). The in-cab computing device 1002 includes an in-cab display 1004, an in-cab processor 1005, scoring algorithms 1006, and a transceiver 1008. In some embodiments, information acquired by the in-cab scorecard algorithms 1006 is obtained from the vehicle computer 1020 via the interface 1007. In other embodiments, the in-cab computing device 1002 is coupled to the vehicle data bus 1025, from which the needed information is acquired for the scorecard algorithms 1006. In further embodiments, the in-cab computing device 1002 is communicatively coupled to both the vehicle computer 1020 and the vehicle data bus 1025 via interface 1007, obtaining needed information from either or both access paths.

Figure 11:
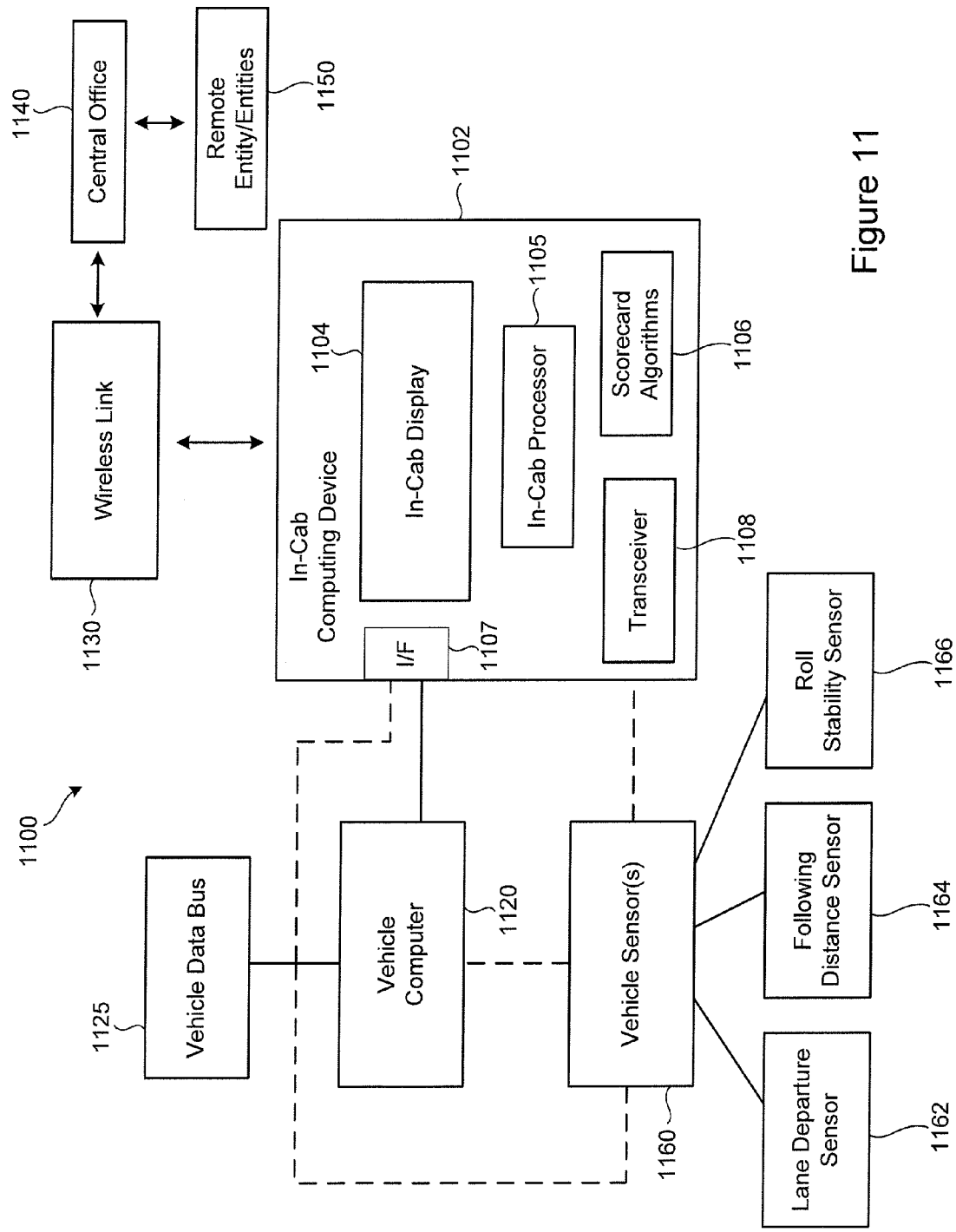

FIG. 11 is a block diagram of a system 1100 for implementing an in-cab driver scoring methodology in accordance with various embodiments. In the representative embodiment shown in FIG. 11, the system 1100 includes an in-cab computing device 1102 communicatively coupled to a vehicle computer 1120 via an interface 1107 and to a central office 1140 via a wireless link 1130 (and possibly other links). The central office 1140 is communicatively coupled to one or more remote entities 1150 and to the in-cab computing device 1102 via a cellular link, satellite link and/or a land-based link. The in-cab computing device 1102 includes an in-cab display 1104, and in-cab processor 1105, scoring algorithms 1106, and a transceiver 1108. In some embodiments, information acquired by the in-cab scorecard algorithms 1106 is obtained from the vehicle computer 1120 via the interface 1107, while in other embodiments the in-cab computing device 1102 is coupled to the vehicle data bus 1125 or to both the vehicle computer 1120 and data bus 1125, from which the needed information is acquired for the scorecard algorithms 1106.

According to the embodiment shown in FIG. 11, a variety of vehicle sensors 1160 are coupled to one or both of the in-cab computing device 1102 and the vehicle computer 1120, such a via the vehicle data bus 1125. A representative, non-exhaustive listing of useful vehicle sensors 1160 include a lane departure sensor 1162 (e.g., a lane departure warning and forward collision warning system), a following distance sensor 1164 (e.g., a collision avoidance system), and a roll stability sensor 1166 (e.g., an electronic stability control system). Representative lane departure warning and forward collision warning systems include Mobileye—5 Series, Takata—SAFETRAK, and Bendix—SAFETYDIRECT. Representative electronic stability control systems include Bendix—(ESP) Electronic Stability Program, and Meritor—(RSC) Roll Stability Control. Representative collision avoidance systems include Bendix—WINGMAN and Meritor—ONGUARD. Each of these sensors 1162, 1164, 1166 or sensor systems is respectively coupled to the vehicle computer 1120 and/or the vehicle data bus 1125. In some embodiments, one or more of the vehicle sensors 1160 can be directly coupled to the in-cab computing device 1102.

Figure 12:
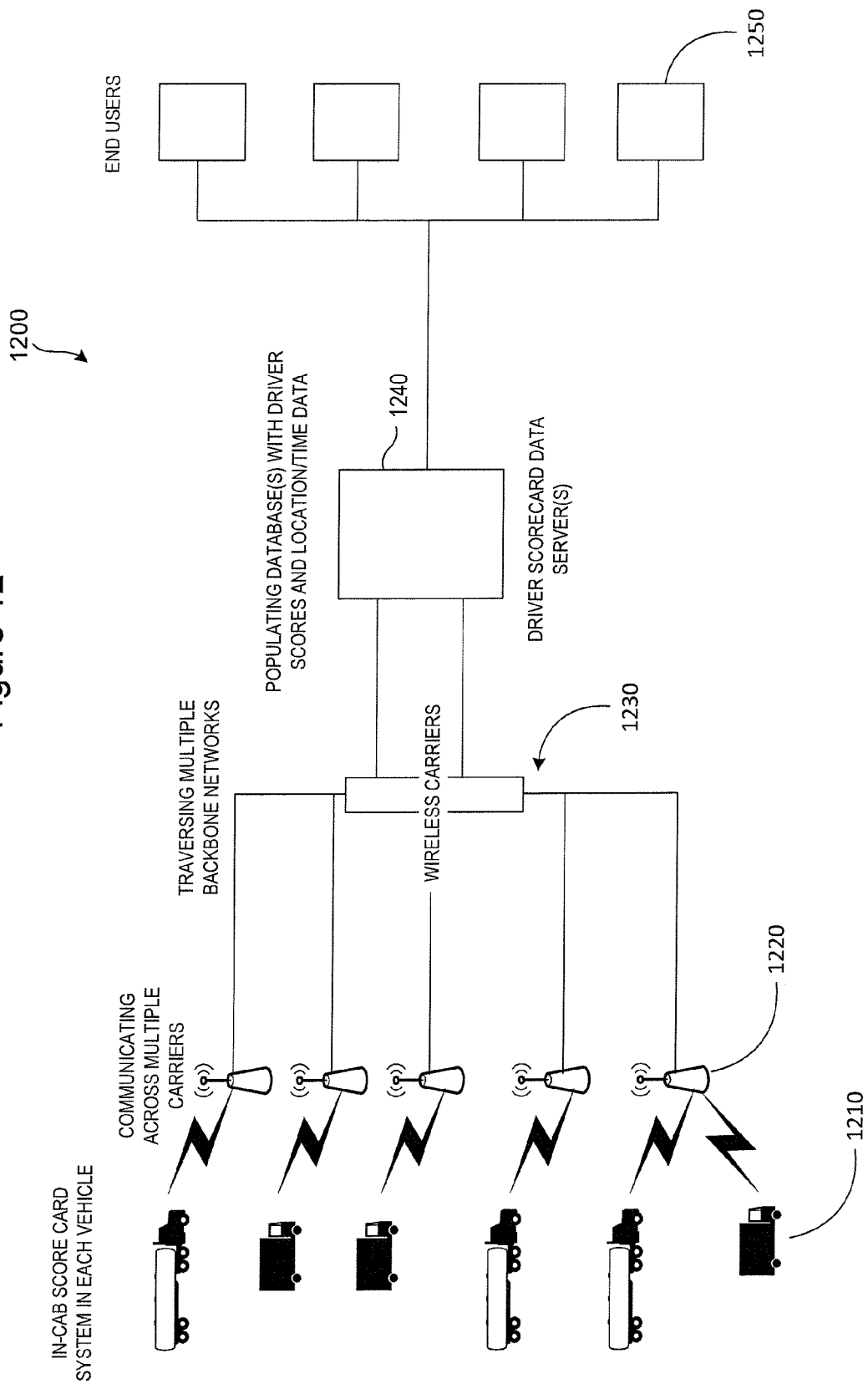

FIG. 12 is a diagrammatic view of a representative driver scoring system with which various embodiments of the disclosure are particularly applicable. As illustrated in FIG. 12, a fleet of vehicles may include various types of commercial vehicles 1210 moving through different locations of a city, state or the country. Each of the vehicles 1210 is configured to communicate wirelessly with a central communication server 1240 (e.g., central office). As used herein, references to a central communication center, central office, data center or other similar reference, do not imply that the entity is necessarily a single facility, although it may be. While the vehicles illustrated in FIG. 12 are depicted as trucks, other vehicles that traverse cellular areas or other wireless communication areas may alternatively or additionally be equipped with communication devices. The vehicles may be, for example, trucks, cars, buses, motorcycles or other vehicles that include the relevant communication capability. Thus, it should be recognized that references to any one or more of the vehicle types is not intended to limit the particular description to the particular type of vehicle unless specifically noted as such.

Communication between each vehicle 1210 and the central office 1240 is predominately effected over-the-air (OTA) using any of a variety of wireless communication technologies. Wireless communication can take the form of cellular communication, such as known CDMA technology, global system for mobile communications (GSM) technology, worldwide interoperability for microwave access (WiMax) technology, or any other suitable technology now known or later developed. Additionally, scorecard data may be communicated between the individual vehicles 1210 and the central office 1240 using a cellular data channel or via a messaging channel, such as one used to support SMS messaging (i.e. a text message). Scorecard data and various vehicle and (optionally) sensor data associated with each driver of a given vehicle is stored locally at each vehicle, and transmitted to the central office on a repeated and/or prompted basis (e.g., at the beginning and/or end of a driver's terminal day, at system login and/or logout, during scheduled or ad hoc data calls). Scorecard history and other data may be transmitted from the central office 1240 to a particular vehicle 1210 based on the identity of the driver. The identity of the driver of a particular vehicle 1210 can be established in a variety of ways, such as by the driver logging into the scorecard system at the beginning of his or her terminal day, when switching vehicles, or at some other time. For example, a driver need not necessarily log into the system each terminal day. A driver may remain associated with a single vehicle indefinitely or for an extended period of time. The logging-in procedure can be used to identify the driver and associate vehicle and sensor data with the particular driver for the driver's work day. At the completion of the work day, the driver can log out of the scorecard system, allowing the system to compute the complete a particular driver's scorecard for the duration of the driver's work day.

According to various embodiments, the vehicles 1210 are equipped with an on-board computing device which includes a cellular transceiver that communicate wirelessly across multiple wireless carriers 1220. Typically, these carriers 1220 may include, for example, providers of CDMA, analog, satellite, etc. The communications traverse multiple backbone networks 1230 before reaching one or more servers 1240 of the central office. Database(s) associated with the servers 1240 are populated with at least driver scorecard data, and may further include geographical location and time data associated with the driver scorecard data (e.g., location and time for each driving event that resulted in a scoring parameter point deduction). These data are aggregated and processed when received at the servers 1240 and made available for long-term storage. Aggregated data may be converted into, for example, views, reports, graphs, charts and paging setups for consumption by authorized end users 1250.

Figure 13:
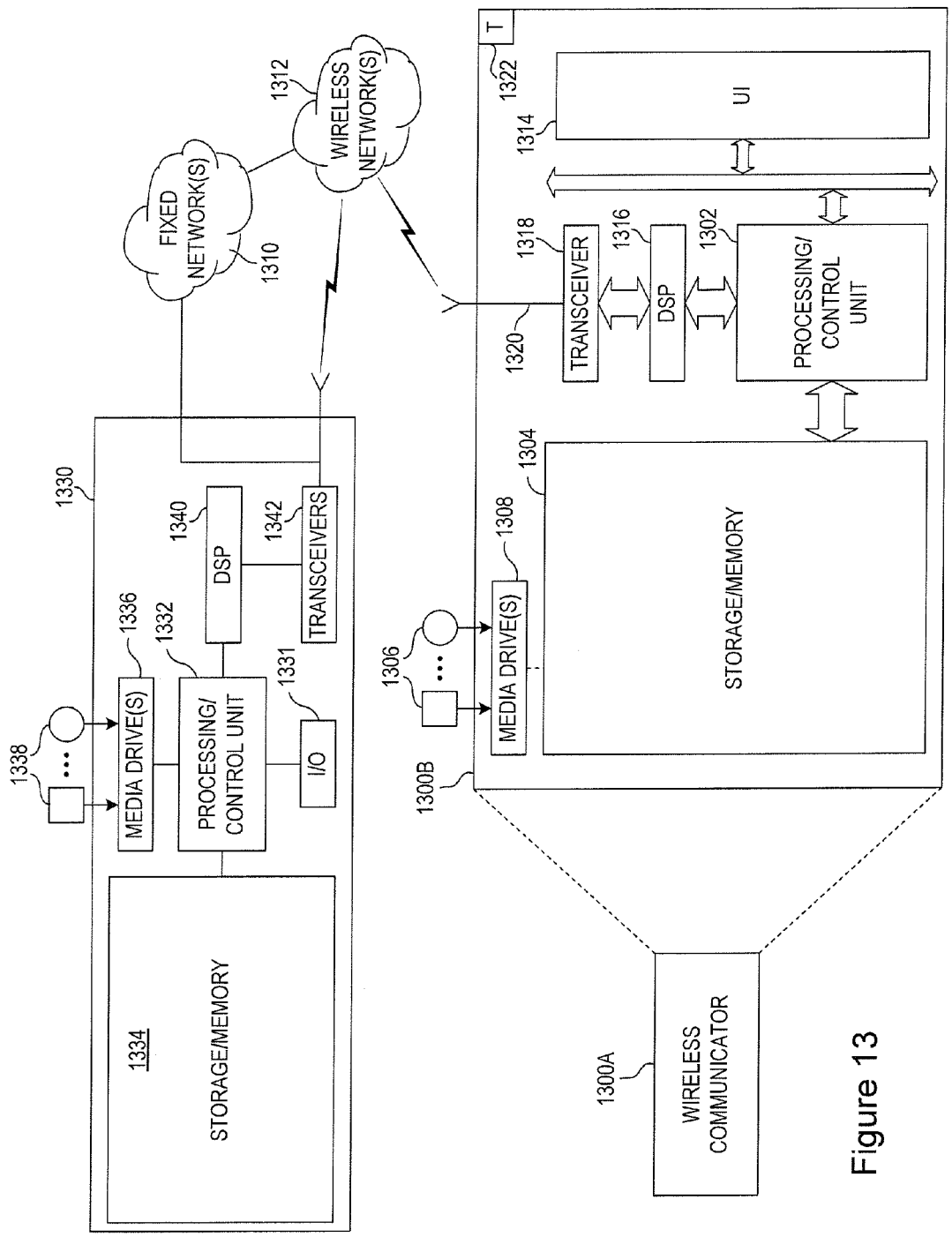

FIG. 13 illustrates representative communication devices that may be used in connection with the scorecard methodologies described herein to transmit and/or receive information such as scoring and score history data. The wireless communicator 1300A represents any communication device capable of performing the vehicle communication functions previously described, such as an on-board computer (OBC). In the illustrated embodiment, the device 1300A represents a device capable of communicating over-the-air (OTA) with wireless networks, such as by way of any one or more of cellular, satellite, etc.

The representative terminal 1300A utilizes computing technology to, among other things, control and manage the wireless communication functions at the vehicle. For example, the representative wireless device 1300B includes a processing/control unit 1302, such as a microprocessor, controller, reduced instruction set computer (RISC), or other central processing module. The processing unit 1302 need not be a single device, and may include one or more processors. For example, the processing unit may include a master processor and one or more associated slave processors coupled to communicate with the master processor.

The processing unit 1302 controls the basic functions of the device 1300B as dictated by programs available in the program storage/memory 1304. The storage/memory 1304 may include an operating system and various program and data modules, such as for collecting the data associated with driver scorecards and presenting/communicating the scorecard data. The storage/memory 1304 also stores one or more scorecard algorithms (.e.g., driver scoring program(s)). In one embodiment, the programs are stored in non-volatile storage to retain the programs upon loss of power. The storage 1304 may also include one or more of other types of read-only memory (ROM) and programmable and/or erasable ROM, random access memory (RAM), subscriber interface module (SIM), wireless interface module (WIM), smart card, or other fixed or removable memory device/media. The functional programs may also be provided by way of external media 1306, such as disks, CD-ROM, DVD, or the like, which are read by the appropriate interfaces and/or media drive(s) 1308. The relevant software for carrying out operations in accordance with the present disclosure may also be transmitted to the device 1300B via data signals, such as being downloaded electronically via one or more networks, such as the data network(s) 1310 and/or wireless network(s) 1312.

The processor 1302 may also be coupled to a user interface (UI) 1314 integral with, or connectable to, the device 1300B. The UI 1314 may include, for example, a keypad, function buttons, joystick, scrolling mechanism (e.g., mouse, trackball), touch pad/screen, or other user entry mechanisms (not shown), as well as a display, speaker, tactile feedback, etc. The representative wireless device 1300B of FIG. 13 also includes circuitry for performing wireless transmissions over the wireless network(s) 1312. A DSP 316 may be employed to perform a variety of functions, including analog-to-digital (A/D) conversion, digital-to-analog (D/A) conversion, encryption/decryption, error detection and correction, bit stream translation, filtering, etc. A transceiver 1318 includes at least a transmitter to provide scoring data, and may also include a receiver, thereby transmitting outgoing radio signals and receiving incoming radio signals, generally by way of an antenna 1320. The device 1300B may also include other types of transceivers 1322, such as to enable wired connections to other devices such as diagnostic devices, or to connect to wireless or wired local area networks.

FIG. 13 depicts a representative computing system 1330 situated at a central office and operable on a network, such as an aggregation of communication servers, real-time cache servers, historical servers, etc. The computing system(s) 1330 may be communicated with via the wireless network(s) 1312 and/or fixed network(s) 1310. In one embodiment, the computing system 1330 represents at least the communication servers and associated computing power to collect, aggregate, process and/or present the data associated with driver scorecards. The system 1330 may be a single system or a distributed system. The illustrated computing system 1330 includes a processing arrangement 1332, such as one or more processors, which are coupled to the storage/memory 1334. The processor 1332 carries out a variety of standard computing functions as is known in the art, as dictated by software and/or firmware instructions. The storage/memory 1334 may represent firmware, media storage, memory, etc.

The processor 1332 may communicate with other internal and external components through input/output (I/O) circuitry 1331. The computing system 1330 may also include media drives 1336, such as hard and floppy disk drives, CD-ROM drives, DVD drives, and other media 1338 capable of reading and/or storing information. In one embodiment, software for carrying out the operations at the computing system 1330 may be stored and distributed on CD-ROM, diskette, magnetic media, removable memory, or other form of media capable of portably storing information, as represented by media devices 1338. Such software may also be transmitted to the system 1330 via data signals, such as being downloaded electronically via a network such as the data network 1310, Local Area Network (LAN) (not shown), wireless network 1312, and/or any combination thereof. The storage/memory 1334 and/or media devices 1338 store the various programs and data used in connection with embodiments of the present disclosure. The illustrated computing system 1330 may also include DSP circuitry 1340, and at least one transceiver 1342 (which is intended to also refer to discrete transmitter/receiver components). The server 1330 and transceiver(s) 1342 may be configured to communicate with one or both of the fixed network 1310 and wireless network 1312.

Hardware, firmware, software or a combination thereof may be used to perform the functions and operations described herein. Using the foregoing specification, some embodiments of the disclosure may be implemented as a machine, process, or article of manufacture by using standard programming and/or engineering techniques to produce programming software, firmware, hardware or any combination thereof. Any resulting program(s), having computer-readable program code, may be embodied within one or more computer-usable media such as memory devices or transmitting devices, thereby making a computer program product, computer-readable medium, or other article of manufacture according to the invention. As such, the terms "computer-readable medium," "computer program product," or other analogous language are intended to encompass a computer program existing permanently, temporarily, or transitorily on any computer-usable medium such as on any memory device or in any transmitting device. From the description provided herein, those skilled in the art are readily able to combine software created as described with appropriate general purpose or special purpose computer hardware to create a computing system and/or computing subcomponents embodying various implementations of the disclosure, and to create a computing system(s) and/or computing subcomponents for carrying out the method embodiments of the disclosure.

An in-cab scorecard system and methodology can be implemented in a wide variety of existing and future fleet management systems, such as those described in commonly owned U.S. Pat. No. 8,442,555 and US Published Patent Application No. 2012/0194679, which are hereby incorporated herein in their respective entireties.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A system, comprising:
   an interface configured to receive vehicle data acquired by a computer system of a vehicle;
   a wireless transceiver configured to effect communications with a central office via one or more networks;
   a display;
   memory configured to store scoring algorithms; and
   a processor configured to:
      receive at least some of the vehicle data;
      generate, in substantially real-time and independently from the central office, a plurality of scores for a plurality of scoring parameters using the stored scoring algorithms and the received vehicle data;
      update, in substantially real-time and independently from the central office, the plurality of scores during a driver's terminal day which is initiated at the driver's terminal start time and completed at the driver's terminal end time; and
      cooperate with the display to present the plurality of scores on the display during the driver's terminal day.

2. The system of claim 1, comprising an in-cab computing device communicatively coupled to the interface and transceiver, the in-cab computing device comprising the display, memory, and processor.

3. The system of claim 1, wherein the processor is configured to update the plurality of scores in response to a detected driving event.

4. The system of claim 1, wherein:
   the memory is configured to store one or more display templates each defining a predetermined graphical layout; and
   the processor is configured to cooperate with the display to present the plurality of scores in a scorecard format on the display using the one or more stored display templates.

5. The system of claim 1, wherein:
   the memory is configured to store user-selectable thresholds associated with at least some of the scoring parameters; and
   the processor is configured to generate and update the plurality of scores for the plurality of scoring parameters using the stored user-selectable thresholds, stored scoring algorithms, and the received vehicle data.

6. The system of claim 5, wherein the user-selectable thresholds comprise user-selectable thresholds established for individual vehicles, groups of vehicles or a fleet of vehicles.

7. The system of claim 1, wherein:
   the memory is configured to store user-selectable total daily scoring thresholds and user-selectable scoring parameter thresholds associated with at least some of the scoring parameters and;
   the processor is configured to generate and update:
      the total daily scoring using the stored user-selectable total daily scoring thresholds, stored scoring algorithms, and the received vehicle data; and
      the plurality of scores for the plurality of scoring parameters using the stored user-selectable thresholds, stored scoring algorithms, and the received vehicle data.

8. The system of claim 7, wherein each of the total daily scoring thresholds is associated with a predetermined level of driver performance.

9. The system of claim 1, wherein the processor is configured to cooperate with the display to present the plurality of scores on the display during a safe mode of operation.

10. The system of claim 9, wherein the processor is configured to cooperate with the display to present at times other than during the safe mode of operation a count of scoring event occurrences and associated score deductions for each scoring parameter during the driver's terminal day.

11. The system of claim 10, wherein the processor is configured to cooperate with the display to present a scorecard history computed from the count of scoring event occurrences and associated score deductions for a plurality of past driver terminal days.

12. The system of claim 1, wherein processor is configured to:
   receive multiple driver information from the central office; and
   present average scores for the plurality of scoring parameters derived from the received multiple driver information on the display.

13. The system of claim 1, wherein the central office comprises a processor configured to:
   receive the vehicle data from the processor; and
   compute, for the driver's terminal day, the plurality of scores for the plurality of scoring parameters using resident scoring algorithms and the received vehicle data;
   wherein the updated scores of the processor match the computed scores of the remote entity processor.

14. The system of claim 1, wherein:
   the central office comprises at least one server configured to store the plurality of scores for the driver's terminal day received from the processor; and
   the central office comprises an interface through which a third party server can access the stored plurality of scores and import the plurality of scores in a format suitable for incorporation into a scorecard producible by the third party server.

15. A system, comprising:
   an interface configured to receive vehicle data acquired by a computer system of a vehicle;
   a wireless transceiver configured to effect communications with a central office via one or more networks;
   one or more sensors configured for installation on the vehicle and to generate sensor data;
   a display;
   memory configured to store scoring algorithms; and
   a processor configured to:
      receive at least some of the vehicle data and sensor data;
      generate, in substantially real-time and independently from the central office, a plurality of scores for a plurality of scoring parameters using the stored scoring algorithms and the received vehicle and sensor data;
update, in substantially real-time and independently from the central office, the plurality of scores during a driver's terminal day which is initiated at the driver's terminal start time and completed at the driver's terminal end time; and
cooperate with the display to present the plurality of scores on the display during the driver's terminal day.

16. The system of claim 15, wherein the one or more sensors comprise one or more of a lane departure sensor, a following distance sensor, and a roll stability sensor.

17. The system of claim 15, wherein at least one of the plurality of scores presented on the display comprises a score derived from the sensor data.

18. A method, comprising:
receiving vehicle data from a vehicle computer system;
storing driver scoring algorithms at the vehicle;
generating, in substantially real-time and at the vehicle, a plurality of scores for a plurality of driver scoring parameters using the stored scoring algorithms and the received vehicle data;
updating, in substantially real-time and at the vehicle, the plurality of scores during a driver's terminal day which is initiated at the driver's terminal start time and completed at the driver's terminal end time; and
presenting the plurality of scores in a cab of the vehicle during the driver's terminal day.

19. The method of claim 18, further comprising:
storing, at the vehicle, user-selectable thresholds established for a fleet of vehicles and associated with at least some of the scoring parameters; and
generating and updating the plurality of scores for the plurality of scoring parameters using the stored user-selectable thresholds, stored scoring algorithms, and the received vehicle data.

20. The method of claim 18, further comprising:
receiving sensor data from one or more third-party sensors added to the vehicle; and
generating, in substantially real-time and at the vehicle, at least some of the plurality of scores for at least some of the plurality of scoring parameters using the stored scoring algorithms and the received vehicle and sensor data.

21. The method of claim 18, further comprising transmitting at least the plurality of scores for the driver's terminal day to a remote server.

* * * * *